United States Patent
Hanna et al.

(10) Patent No.: US 10,392,877 B2
(45) Date of Patent: Aug. 27, 2019

(54) CHUCK FOR A DRILL HEAD OF A ROTATION DRILLING RIG

(71) Applicant: EPIROC ROCK DRILLS AKTIEBOLAG, Örebro (SE)

(72) Inventors: Jan Hanna, Hässelby (SE); Martin Forsberg, Osby (SE); Karolina Årdh, Älmhult (SE)

(73) Assignee: EPIROC ROCK DRILLS AKTIEBOLAG, Örebro (SE)

( * ) Notice: Subject to any disclaimer, the term of this patent is extended or adjusted under 35 U.S.C. 154(b) by 176 days.

(21) Appl. No.: 15/306,274

(22) PCT Filed: Apr. 22, 2015

(86) PCT No.: PCT/SE2015/050455
§ 371 (c)(1),
(2) Date: Oct. 24, 2016

(87) PCT Pub. No.: WO2015/163813
PCT Pub. Date: Oct. 29, 2015

(65) Prior Publication Data
US 2017/0044851 A1 Feb. 16, 2017

(30) Foreign Application Priority Data

Apr. 24, 2014 (SE) .................................. 1450486

(51) Int. Cl.
*E21B 19/10* (2006.01)
*E21B 19/16* (2006.01)
(Continued)

(52) U.S. Cl.
CPC ............... *E21B 19/10* (2013.01); *E21B 3/02* (2013.01); *E21B 19/16* (2013.01); *F16F 1/126* (2013.01); *F16F 1/18* (2013.01); *E21B 7/021* (2013.01)

(58) Field of Classification Search
CPC .......... E21B 19/07; E21B 19/10; B23B 30/02
(Continued)

(56) References Cited

U.S. PATENT DOCUMENTS 2,489,905 A * 11/1949 Kuert .................... B25B 27/12
29/223
2,733,938 A * 2/1956 Davis .................... E21B 19/10
175/423

(Continued)

FOREIGN PATENT DOCUMENTS

CL        2016002701 A1   2/2017
CN        101018925 A     8/2007
(Continued)

OTHER PUBLICATIONS

English Translation of Chinese Office Action dated Nov. 16, 2017 in corresponding Chinese Application No. 201580020788.5 (11 pages).

(Continued)

*Primary Examiner* — Kenneth L Thompson
(74) *Attorney, Agent, or Firm* — Jeffri A. Kaminski; Venable LLP

(57) ABSTRACT

A chuck for a drill head of a rotation rock drilling rig, wherein a plurality of jaws are equally angularly distributed around a grip position axis, wherein the jaws co-operate with actuator means for radial movements of the jaws, and wherein the chuck includes urging means being arranged for influencing the jaws into the release position. The urging means is a partially annular jaw spring surrounding said axis and having two spring ends adjacent to each other. The jaws together form an inside seat for the jaw spring and the jaw spring is arranged for fixing engagement with one of the jaws. The invention also relates to a drill head, a rig and a jaw spring.

11 Claims, 6 Drawing Sheets

(51) Int. Cl.
  *E21B 3/02* (2006.01)
  *F16F 1/18* (2006.01)
  *F16F 1/12* (2006.01)
  *E21B 7/02* (2006.01)

(58) Field of Classification Search
  USPC .................. 166/77.52, 75.14; 294/102.2
  See application file for complete search history.

(56) References Cited

U.S. PATENT DOCUMENTS

| | | | |
|---|---|---|---|
| 2,768,830 A | | 10/1956 | Janson |
| 3,167,128 A | | 1/1965 | Sutliff |
| 3,472,535 A | * | 10/1969 | Kinley ............... E21B 19/10 188/67 |
| 3,741,322 A | | 6/1973 | Wolters |
| 3,992,019 A | | 11/1976 | Crawshay |
| 4,179,782 A | * | 12/1979 | Forman ............... B25B 7/02 29/268 |
| 4,508,180 A | | 4/1985 | Klueber |
| 4,611,837 A | * | 9/1986 | Aleck ............... F16L 37/088 285/305 |
| 4,844,489 A | | 7/1989 | Acker, III et al. |
| 6,311,792 B1 | * | 11/2001 | Scott ............... E21B 19/10 166/379 |
| 8,696,041 B1 | * | 4/2014 | Kemp ............... E21B 19/10 294/102.2 |
| 2002/0061224 A1 | * | 5/2002 | Allamon ............ E21B 19/10 403/374.1 |
| 2007/0193418 A1 | | 8/2007 | Carnesi |
| 2017/0044832 A1 | | 2/2017 | Hanna et al. |

FOREIGN PATENT DOCUMENTS

| | | |
|---|---|---|
| CN | 201241638 Y | 5/2009 |
| CN | 101538989 A | 9/2009 |
| CN | 101705785 A | 5/2010 |
| CN | 101892814 A | 11/2010 |
| CN | 102094585 A | 6/2011 |
| CN | 102330537 A | 1/2012 |
| CN | 102518402 A | 6/2012 |
| CN | 102606090 A | 7/2012 |
| CN | 202706948 U | 1/2013 |
| CN | 203515382 U | 4/2014 |
| DE | 3334979 A1 | 6/1985 |
| DE | 20312517 U1 | 1/2004 |
| GB | 2503811 A | 1/2014 |
| SU | 515871 A1 | 5/1976 |

OTHER PUBLICATIONS

PCT/ISA/210—International Search Report—dated August 24, 2015 (Issued in Application No. PCT/SE2015/050455).

PCT/ISA/237—Written Opinion of the International Searching Authority—dated August 24, 2015 (Issued in Application No. PCT/SE2015/050455).

Chilean Office Action dated May 9, 2018 in corresponding Chilean Application No. 2016-002702 (14 pages).

Australian Examination Report dated Oct. 26, 2018 in corresponding Australian Application No. 2015250323 (5 pages).

* cited by examiner

CHUCK FOR A DRILL HEAD OF A ROTATION DRILLING RIG

CROSS-REFERENCE TO RELATED APPLICATIONS

The application claims priority to Swedish patent application 1450486-4 filed 24 Apr. 2014 and is the national phase under 35 U.S.C. § 371 of PCT/SE2015/050455 filed 22 Apr. 2015.

FIELD OF THE INVENTION

The invention relates to a chuck for a rotation drilling drill head, wherein jaws are distributed around a grip position axis, and wherein the chuck includes urging means being arranged for influencing the jaws into a release position.

The invention also concerns a drill head, a rig and a jaw spring.

BACKGROUND OF THE INVENTION

Drill heads for exploration drilling rigs are previously known that are equipped with hydraulically actuated chucks for gripping, holding and rotating pipes constituting the drill string components.

The jaws inside such chucks are radially movable between grip and release positions with the aid of a hydraulically powered actuator.

In order to hold the jaws in place in slots in the chuck spindle and to move them from the grip position into the release position, there are provided urging means effecting the jaw movement away from the grip position axis so as to open the chuck for releasing the grip on the drill string.

In particular, in the known chuck, the back sides of the jaws are tapered and forced against a tapered surface associated with the axially movable actuator.

There have been experienced problems with current urging means in that they sometimes are not capable of fully bringing the jaws from the grip position into the release position thereby preventing a drill string from passing through the chuck.

AIM AND MOST IMPORTANT FEATURES OF THE INVENTION

It is an aim of the present invention to address the above problem with the background art and to at least reduce these problem.

This aim is obtained with respect to a chuck as described above in that the urging means is a partially annular jaw spring surrounding said axis and having two spring ends adjacent to each other, that the jaws together form an inside seat for the jaw spring, said seat being open towards the grip position axis, that the jaw spring is arranged for fixing engagement with any one of the jaws, and that the jaw spring is provided with tool engagement means at each spring end for co-operation with a spring installation tool.

Hereby the jaw spring can be formed for increased working range with maintained spring action. This means that sufficient spring force can be exerted so that the jaws are moved over a sufficient radial distance to open the chuck not only for releasing the grip but also for consistently allowing passage of components of the drill string having considerably larger diameters than the tubular drill rods, viz. core barrel assemblies and even drill bits and reaming shells. This makes the whole drill string handling process easier, since the entire drill string can be assembled and disassembled above the chuck. This is in contrast to background art drill head where it dismantling of the drill string is complicated.

This is an advantage over the background art urging means that will sometimes not fully push the jaws back against the bowl therefore preventing such larger diameter components from passing through the chuck. Making an effort to provide stronger background art urging means would be insufficient to solve this problem and also unfortunately impose a new problem by making them more difficult to install.

The jaw spring is now made from a single partial loop of suitably strong spring material. "Partially annular" means that the jaw spring describes a loop less than 360° in its unstressed state, i.e. is formed as a ring having an opening between the spring ends.

Typically, in its most stressed and compressed state, being in the grip position of the chuck when the jaws are closest to the grip position axis, the jaw spring is compressed such as to describe a (partial) ring-shape close to 360°. It is important that the jaw spring also in the release position, where the jaws are most distant from the grip position axis, describes a ring-shape being sufficient to contact and actuate all jaws of the chuck. This is guaranteed by the jaw spring having sufficient length and being arranged for fixing engagement with one of the jaws. The latter prevents that a jaw ends up in the opening between the spring ends.

The fact that the jaws together form an inside open seat for the jaw spring allows mounting and replacement of the jaw spring by contracting it so that it can be inserted into the seat and be released from the seat and can be removed. Said seat is open towards the grip position axis. Providing the jaw spring with tool engagement means at each spring end for co-operation with a spring installation tool having mating corresponding engagement elements simplifies handling and accurate positioning of the jaw spring in the seat.

It is preferred that the jaw spring has a flat cross section since it allows a wide working range and easy installation with an uncomplicated tool. Preferably a ratio between an axial width of the jaw spring (seen along the grip position axis) and a radial thickness thereof ranges between 2 and 6 and more preferably between 3 and 5. The tool engagement means are suitably recesses and preferably through holes for engagement and co-operation with pins of a spring installation tool being basically constructed as a lock ring installation pliers. Typically the pins are placed at the ends of shanks of such pliers.

Advantageously the jaw spring is provided with a fixing means for fixing engagement with one jaw. The fixing means is an element that is arranged such that it comes into fixed engagement with the jaw in question when the spring is in its mounted position. Typically the fixing means is in the form of a peg being a bent end portion of the jaw spring, or can also be an element such as a pin being fastened to the jaw spring, for fixing or fastening engagement with a recess such as a drilled hole formed in a part of the seat in any one of the jaws. Suitably each jaw is formed with such a recess. If the jaws are difficult to extract because they are flush or nearly flush with the spindle, a threaded hole can be drilled in the bottom of the recess in each jaw for allowing co-operation with an extraction tool for extraction of the jaw from the chuck spindle for example for replacement purposes.

The chuck includes 3, 4 or more jaws. Preferably the chuck includes 5 jaws.

The invention also concerns a drill head for a rotation rock drilling rig, including a chuck according to the above.

The invention also concerns a rig, including such a drill head.

The invention further concerns a jaw spring for a drill head chuck of a rotation drilling rig, wherein a plurality of jaws are equally angularly distributed around a grip position axis of the chuck, wherein the jaws co-operate with actuator means for radial movements of the jaws between a grip position and a release position, and wherein the jaw spring is arranged for influencing the jaws into the release position. The jaw spring is partially annular for surrounding said axis in its mounted position and it has two spring ends adjacent to each other. The jaw spring is also arranged for fixing engagement with one of the jaws, and the jaw spring is provided with tool engagement means at each spring end for co-operation with a spring installation tool.

Advantageously the jaw spring has a flat cross section. The tool engagement means are suitably through holes. The jaw spring is advantageously provided with a fixing means for fixing engagement with one of the jaws. The fixing means is preferably a peg formed by a bent end portion of the jaw spring for co-operation with a recess formed in the jaw.

BRIEF DESCRIPTION OF DRAWINGS

The invention will now be explained in more detail by way of an embodiment at the background of the annexed drawings; wherein.

DESCRIPTION OF EMBODIMENTS

Figure 1:
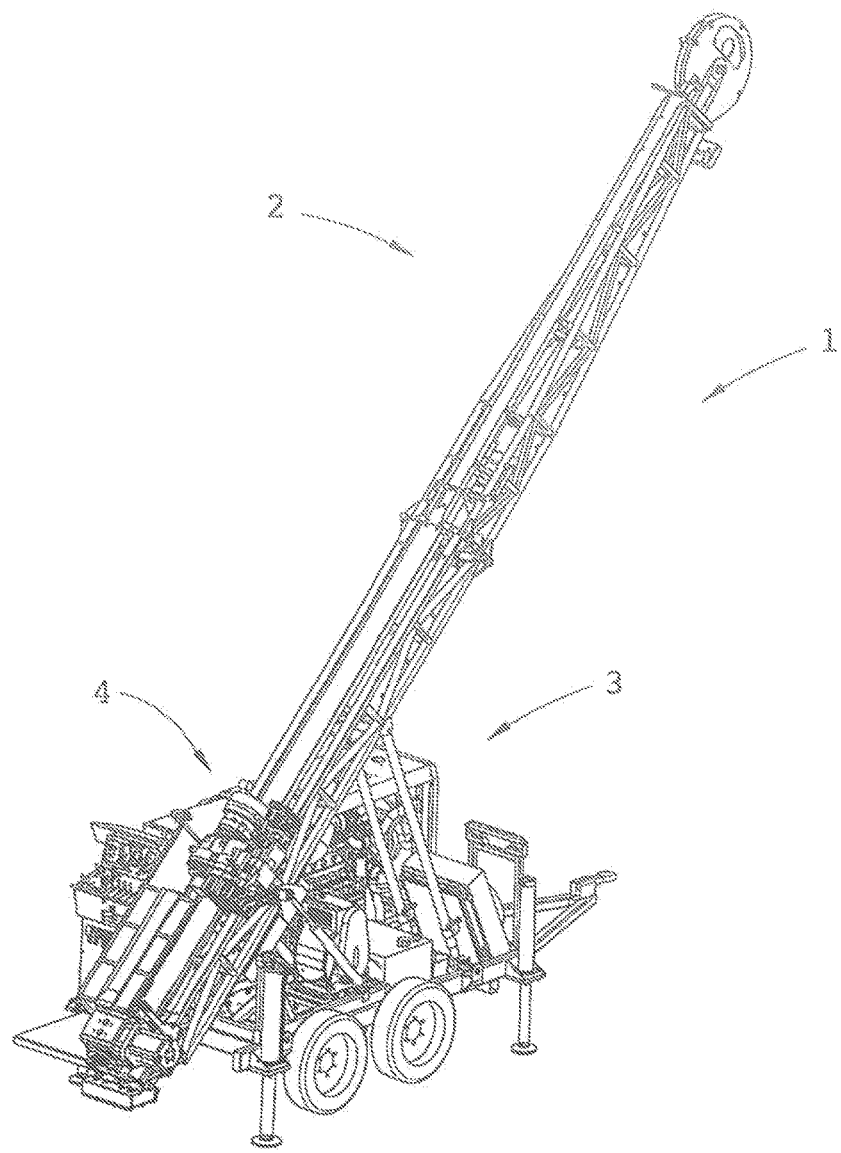
FIG. 1 illustrates in a perspective view a rotation drilling rig equipped according to the invention.

FIG. 1 shows a rotation drilling rig 1 for exploration drilling, the rig having a mast 2 with an elongate feed beam supporting a drill head 4. The drill head 4 is movable up and down along the feed beam. A power unit 3 contains usual machinery for the supply of power to the drill head 4.

Figure 2:
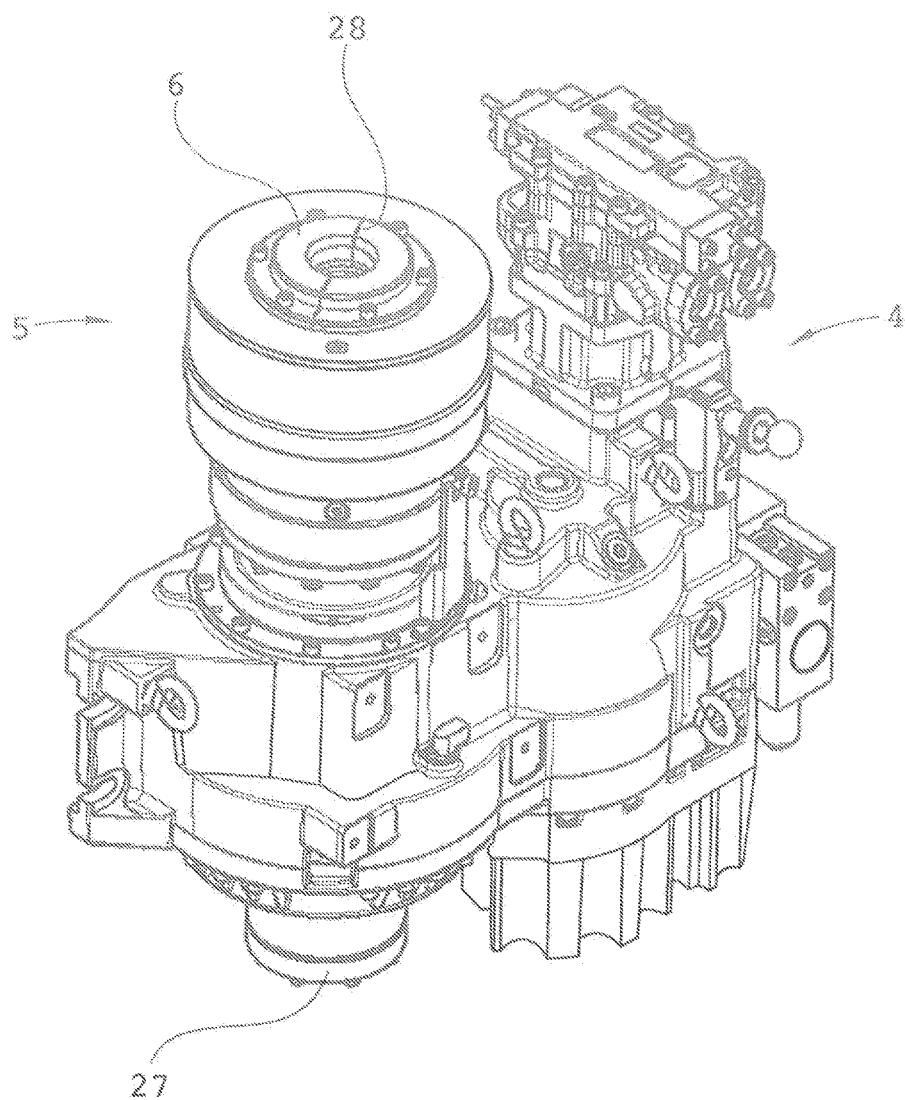
FIG. 2 shows in a perspective view a drill head according to the invention.

At the top of the drill head 4, shown in greater scale in FIG. 2, there is positioned a chuck 5 for gripping the drill string (not shown in the Figures) for transferring rotational and axial movements to the drill string.

Figure 3:
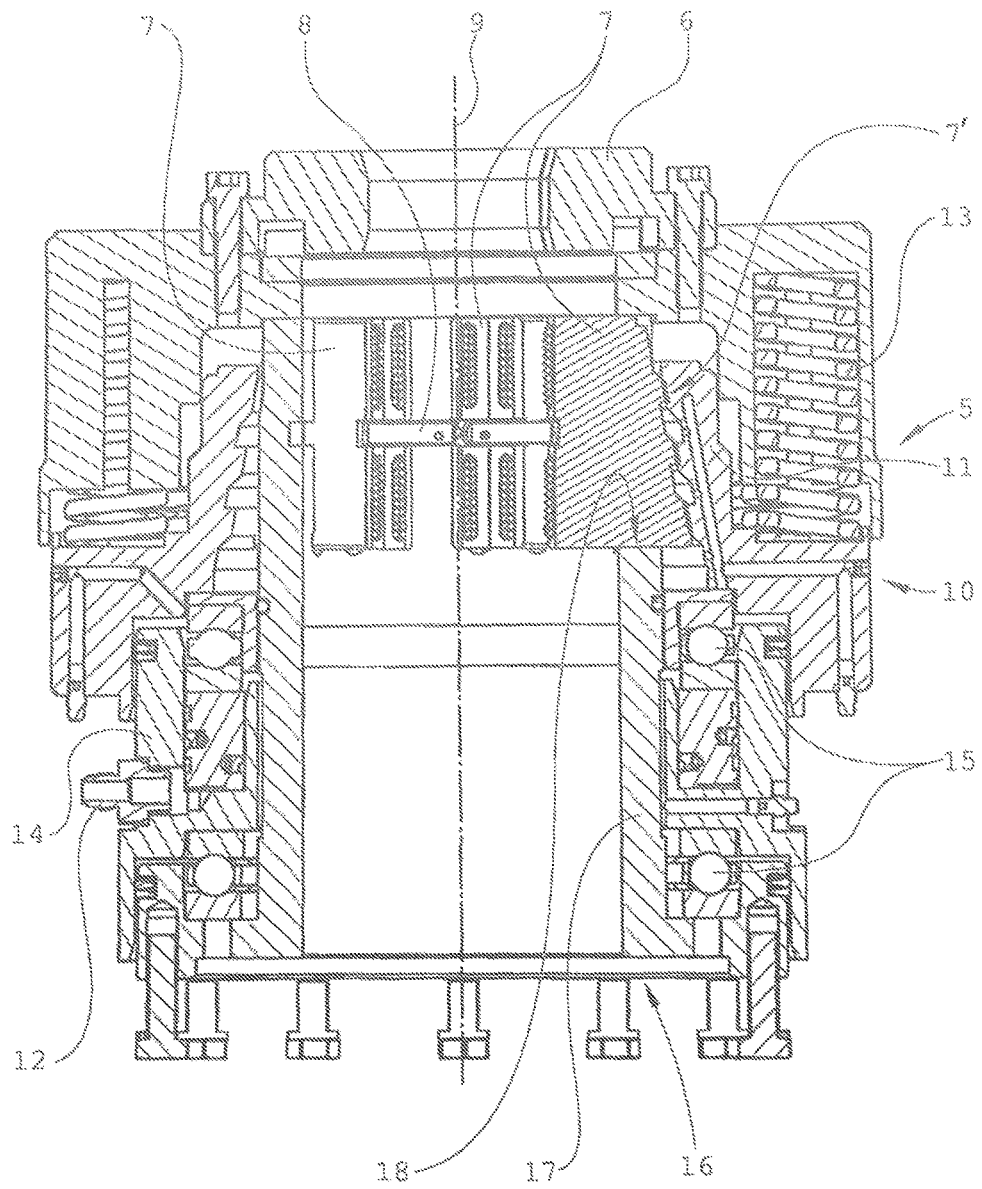
FIG. 3 shows an axial section of a chuck according to the invention for a drill head.

The chuck 5 shown in an axial section in FIG. 3 includes a chuck spindle 17 having a plurality of radially oriented slots 18 for radially movable jaws 7. The jaws in turn comprise gripping surfaces for engagement with the drill string. On top of the chuck 5, there is positioned a split bushing 6 for guiding the drill string so as to achieve centering of the gripped drill string axis to be essentially co-axial with a grip position axis 9.

The jaws 7 together form a seat for a part-annular jaw spring 8 being an urging means functioning to press the jaws 7 radially in directions from the grip position axis 9 into a release position. Hereby the radial outsides 7' of the jaws 7 make contact with a chuck bowl 11 being part of a jaw actuator means 10 having the function of actuating the jaws 7 between the release position and the grip position.

The chuck bowl 11 has a tapered inside corresponding to an inclined shape of the outside 7' of the jaws. Furthermore, the inclined outside 7' of the jaws is stepped corresponding to a stepped inside of the chuck bowl 11. The reason for this design is to provide for two relative inclinations of the contact surfaces between the jaws and the chuck bowl. This way it is possible in a first mode, where high gripping force is not required, to provide low gripping force and relatively high radial displacement of the jaws outside the grip position. In a second mode, where high gripping force is indeed required corresponding to what is required in the grip position, it has been made possible to provide for such high gripping force and relatively low radial displacement.

The jaw actuator means 10 further includes a stationary member 14 having a hydraulic supply inlet 12 for supplying hydraulic fluid under pressure to a piston-cylinder arrangement. Upon actuation of the piston-cylinder arrangement the chuck bowl 11 is pressed so as to move upwardly, (when the chuck is oriented as seen in FIG. 3), against the force of a number of chuck bowl return springs 13 being helical springs that are distributed around the chuck bowl.

Upon pressurizing through the hydraulic supply inlet 12, the chuck bowl 11 thus moves axially up (when the chuck is oriented as seen in FIG. 3), such that the jaws 7 can move radially out from the grip position of the chuck 5 into the release position, where a gripped drill string component inside the chuck 5 will be released.

Upon termination of supply of pressure fluid into the hydraulic supply inlet 12 and connecting it to tank or the like, the chuck bowl return springs 13 forces the chuck bowl 11 down into the closes position of the chuck, (as seen in FIG. 3), hereby pressing the jaws 7 into the grip position again because of the co-operation between the tapered inside surface of the chuck bowl and the inclined outside surfaces of the jaws.

The jaw spring 8 is arranged for firmly pressing the jaws 7 against the chuck bowl 11 thus guaranteeing the movement of the jaws to the release position and guaranteeing passage space for the drill string inside the chuck.

15 indicates ball bearings between the stationary member 14 and the rotatable chuck spindle 17. 16 indicates a chuck interface for attaching it to another rotatable portion of the drill head 4.

Figure 4:
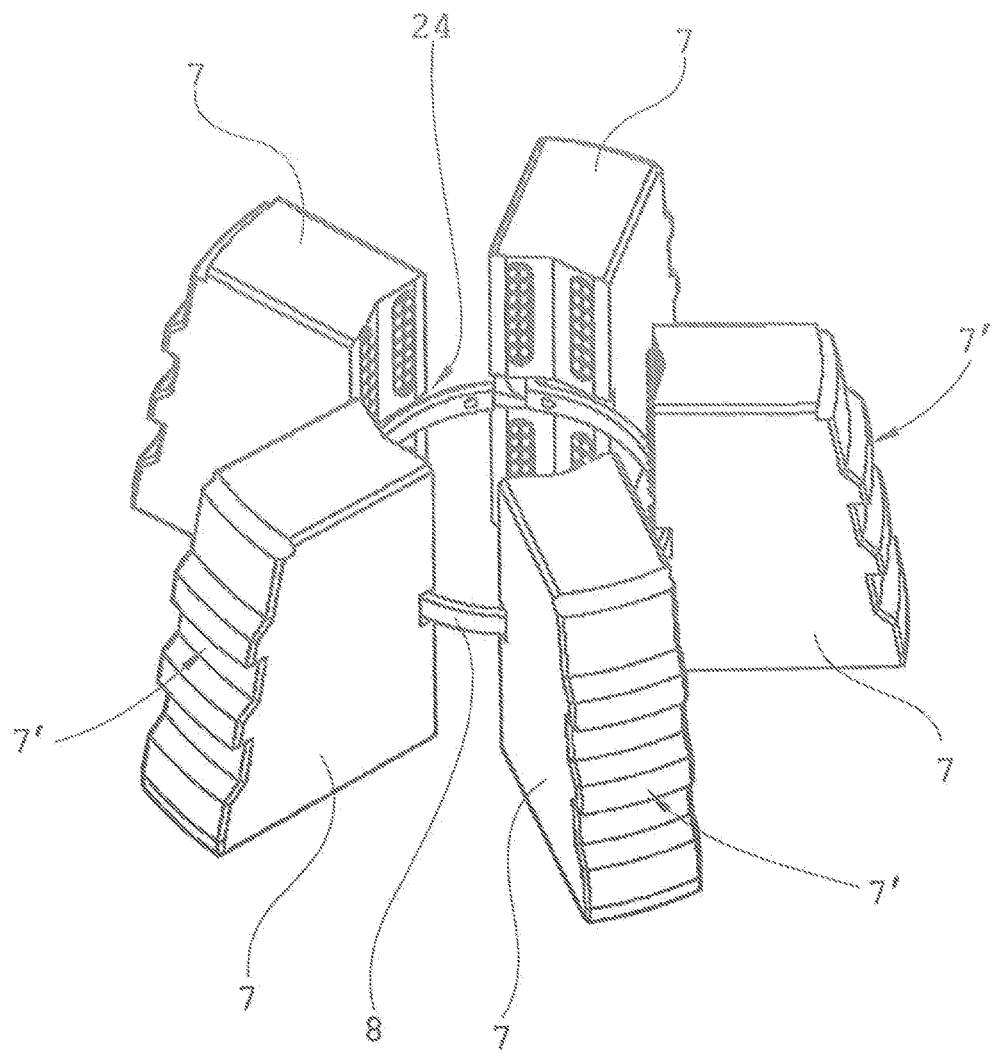
FIGS. 4 and 5 show in separated, perspective views jaws of the chuck in two different positions.

FIG. 4 shows five jaws 7 separated from the other elements of the chuck. The jaws are evenly distributed around the grip position axis (not shown) and they are shown in FIG. 4 as they are positioned in the chuck spindle in the grip position, the jaws 7 being closest to each other and in a position to grip a drill string. The jaw spring does not quite describe a full circle in this most compressed position.

24 indicates the above mentioned inside seat for the jaw spring 8, the seat generally seen being a more or less circular groove in the inside surface of the jaws 7 in their mounted position. The seat 24 is open in the direction of the grip position axis (see FIG. 3).

Figures 5, 6:
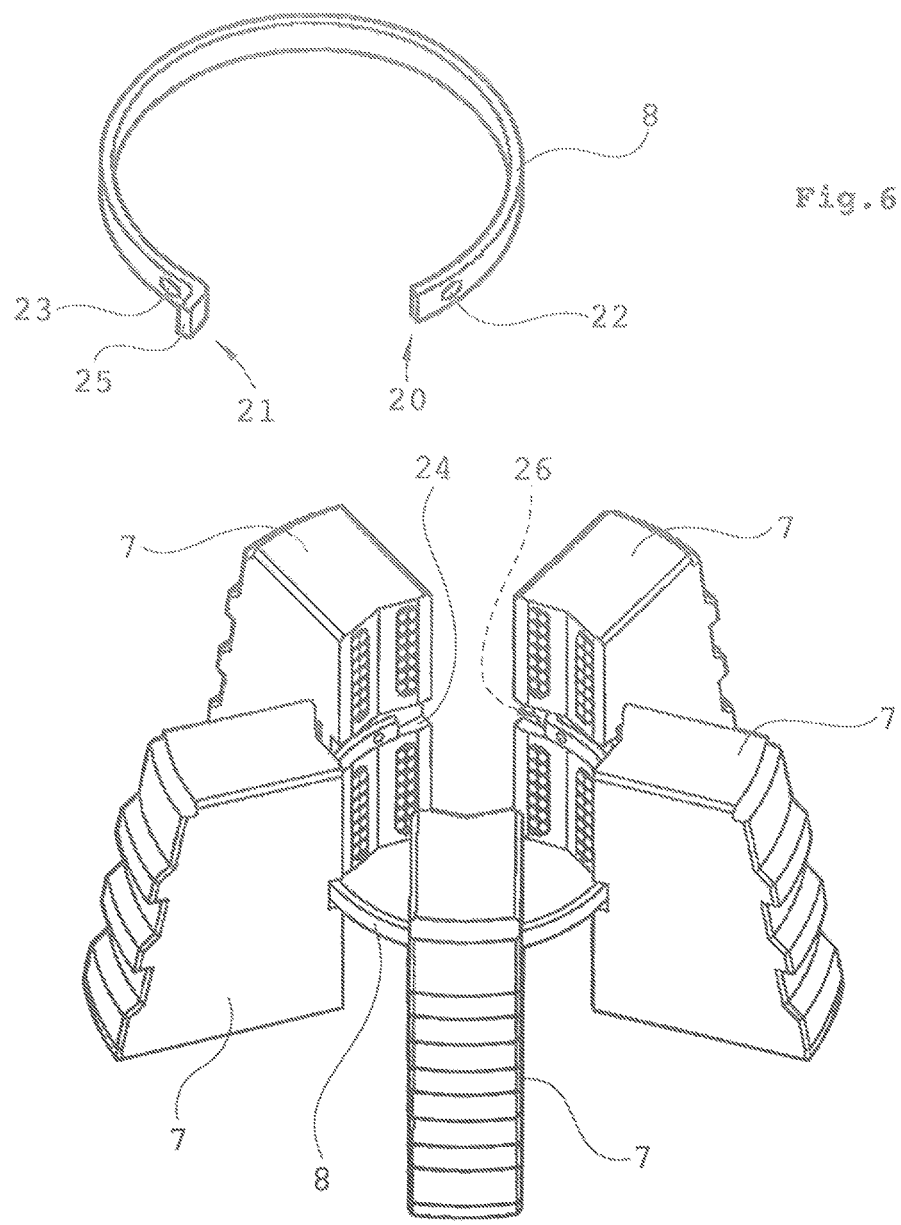
FIG. 6 shows in a perspective view a jaw spring for a chuck according to the invention.

FIG. 5 is a representation corresponding to the one in FIG. 4, wherein the jaws have been moved to the release position, and wherein they have been displaced to be more distant from each other so as to release a grip string component. 26 indicates a fixing recess for the jaw spring.

FIG. 6 shows in a perspective view the jaw spring 8 which is a "flat" cross section jaw spring having part annular or part ring-shaped configuration. The flat jaw spring construction, suitably of an ordinary spring steel material, makes it easy to design a strong jaw spring having predictable spring force properties over a wide working range.

At a first spring end 20 and well as at a second spring end 21 there are provided respective tool engagement means in the form of through holes 22 and 23 for co-operation with engagement elements of a mounting tool for mounting the jaw spring in the seat 24 for change or replacement of the jaw spring or for positioning thereof during manufacture of the chuck. The flat spring design makes a stronger jaw spring possible. The increased spring stiffness made possible through the inventive jaw spring fully retracts the jaws allowing passage of large diameter components through the fully open chuck.

Even though the flat steel jaw spring is stiffer, it is easier to install using a simple mounting tool.

The mounting tool typically functions as lock ring pliers in that it is equipped with pins at the end of shanks that engage in the holes 22 and 23. The tool further includes means for bringing the pins, when they are engaged in the holes 22 and 23, together, so as to compress the jaw spring into a smaller diameter such that it is small enough to be positioned in the seat. The holes are preferably specially shaped in that they are oriented so that the jaw spring will not jump off the tool as it is compressed. Preferably the holes are parallel to each other in the relaxed spring position.

25 indicates a fixing means being directed radially out from said grip position axis (9 in FIG. 3). The fixing means 25 is as shown a bent end portion of the jaw spring 8 formed as a peg for engagement into a corresponding hole (26 in FIG. 5) being provided in the seat 24 of (at least) one of the jaws 7. Any one or all jaws can have such holes for allowing the peg to be located in the respective jaw or jaws.

As can be seen from FIGS. 4 and 5, the fixing means 25 is somewhat displaced from the centre of the jaw 7 where it is engaged. The reason for this is that hereby better force distribution is afforded between the individual jaws.

Drill bushings are required to center the drill rod in drill heads on mineral exploration drills (also called diamond drills). The bushings, through which the drill rod passes, are located at the top and bottom ends of the chuck and the drill head spindle respectively. The drill rods in exploration drills turn at high rpm (1000 rpm is typical) and the drill bushings help center the drill string in the drill head at the chuck end of the spindle and also at the other end.

To provide the required centering, the clearance between the drill bushing and the drill rod has to be quite small—a typical nominal diametrical clearance is about 1.5 mm. I.a. the core barrel at the end of the drills string has a larger diameter than that and cannot pass a typical one-piece drill bushing. This makes it difficult to install the drill bushing and makes dismantling of the drill string complicated.

The new feature of the split bushings described here is that it can be made for nearly the same low cost as a one-piece bushing. Also the two bushing halves remains a true circle by locating the bushing halves against a supporting outside diameter. The bushing halves are then bolted in place.

The split bushing is made by cutting a one piece bushing into two equal halves. The two halves of the bushing are located against a diameter which centralizes the bushings to form a true circle centered on the spindle centerline (interrupted only by the two gaps caused by the cutting action). The two small gaps do not influence the function since they cannot let the drill rod move significantly more off the center line than the diametric clearance lets the drill rod be off center.

Figure 7:
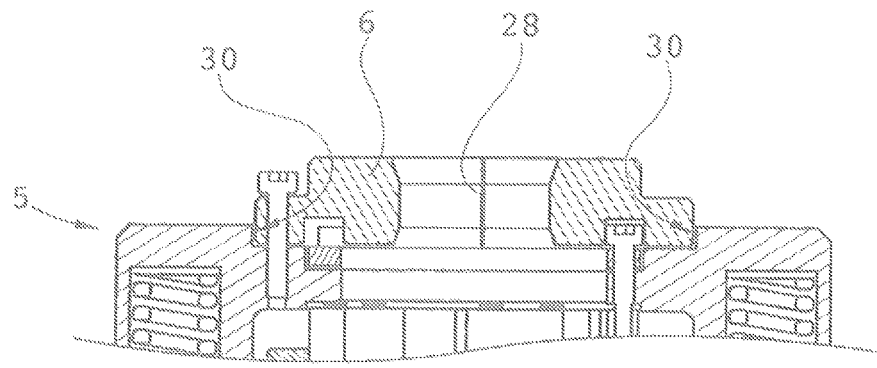
FIGS. 7 and 8 show part sections of parts of the inventive drill head.

FIG. 7 illustrates the top end of the chuck 5 with a split bushing 6 with a gap from manufacture indicated with 28. A locating inside seat in the chuck is indicated with 30.

Figure 8:
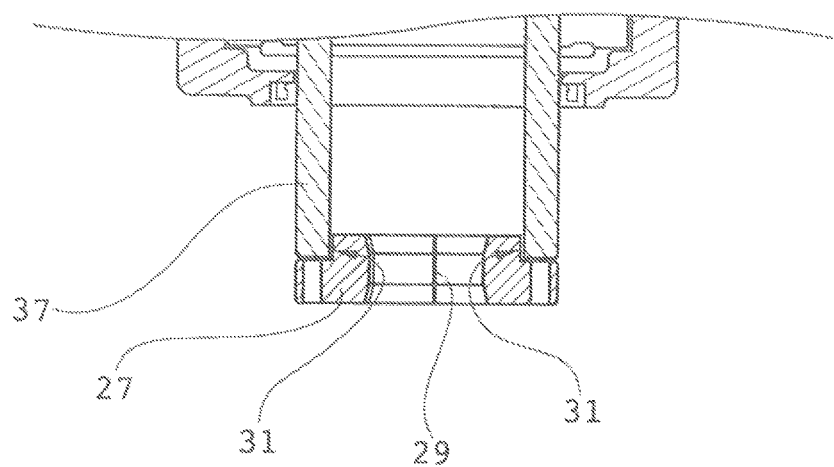

FIG. 8 illustrates the bottom end of a drill head spindle 37 with a split bushing 27 with a gap from manufacture indicated with 29. A locating inside seat in the spindle is indicated with 31.

The bushing bores, both on top of the chuck and at the bottom of the drill head spindle, have chamfered entry edges on both sides. These chamfers help guide the drill rod through the bushings whether it is moving through the bushings in either direction. For example: when a drill rod is lowered through the drill head or a drill head is lowered over a drill rod held in the foot clamp, the chamfered edges assist in allowing smooth movement and prevents the drill rods getting stuck at e.g. areas where there may be a small misalignment between a drill rod and a drill head.

Split bushings are easy to install even when a drill rod passes through the chuck. The split bushing is also easy to remove and so allows the core barrel, reaming shell and possibly even the drill bit which all have a larger nominal diameter than the bushing internal diameter to be passed through the drill head. The cost of the split bushing is higher than a one piece bushing only by the cost of cutting the one piece bushing in two halves. This additional cost is, however, much less than making split bushings with no gaps.

The invention claimed is:

1. Chuck for a drill head of a rotation drilling rig, comprising:
    a plurality of jaws are equally angularly distributed around a grip position axis being an axis of a gripped drill string component, wherein each one of the jaws on a radial inside has a grip surface for engagement with the drill string component, wherein the jaws co-operate with actuator means for radial movements of the jaws between a grip position and a release position, and wherein the chuck includes urging means being arranged for influencing the jaws into the release position, wherein
    the urging means is a partially annular jaw spring surrounding said axis and having two spring ends adjacent to each other,
    the jaws together form an inside seat for the jaw spring, said seat being open towards the grip position axis,
    the jaw spring is arranged for fixing engagement with any one of the jaws, and
    the jaw spring is provided with tool engagement means at each spring end for co-operation with a spring installation tool, wherein the jaw spring has a flat cross section.

2. Chuck according to claim 1, wherein a ratio between an axial width of the jaw spring and a radial thickness thereof ranges between 2 and 6.

3. Chuck according to claim 2, wherein the tool engagement means are through holes.

4. Chuck according to claim 1, wherein the jaw spring is provided with a fixing means for fixing engagement with one of the jaws.

5. Chuck according to claim 4, wherein the fixing means is a peg formed by a bent end portion of the jaw spring, said peg co-operating with a recess being formed in at least one of the jaws.

6. Chuck according to claim 5, wherein a recess is formed in each jaw.

7. Chuck according to claim 1, wherein the chuck includes 3, 4 or 5 jaws.

8. Jaw spring for a drill head chuck of a rotation drilling rig, wherein a plurality of jaws are equally angularly distributed around a grip position axis of the chuck, wherein the jaws co-operate with actuator means for radial movements of the jaws between a grip position and a release position, and wherein the jaw spring is arranged for influencing the jaws into the release position, wherein the jaw spring is partially annular for surrounding said axis in its mounted position, and that it has two spring ends adjacent to each other, the jaw spring is arranged for fixing engagement with one of the jaws, and the jaw spring is provided with engagement means at each spring end for co-operation with a spring installation tool, and includes a flat cross section.

9. Jaw spring according to claim 8, wherein the tool engagement means are through holes.

10. Jaw spring according to claim 8, wherein the jaw spring is provided with a fixing means for fixing engagement with one of the jaws.

11. Jaw spring according to claim 10, wherein the fixing means is a peg formed by a bent end portion of the jaw spring, for co-operation with a recess being formed in one of the jaws.

\* \* \* \* \*